April 22, 1924.
W. L. ECKHARDT
CLUTCH
Filed Aug. 4, 1922
1,491,342
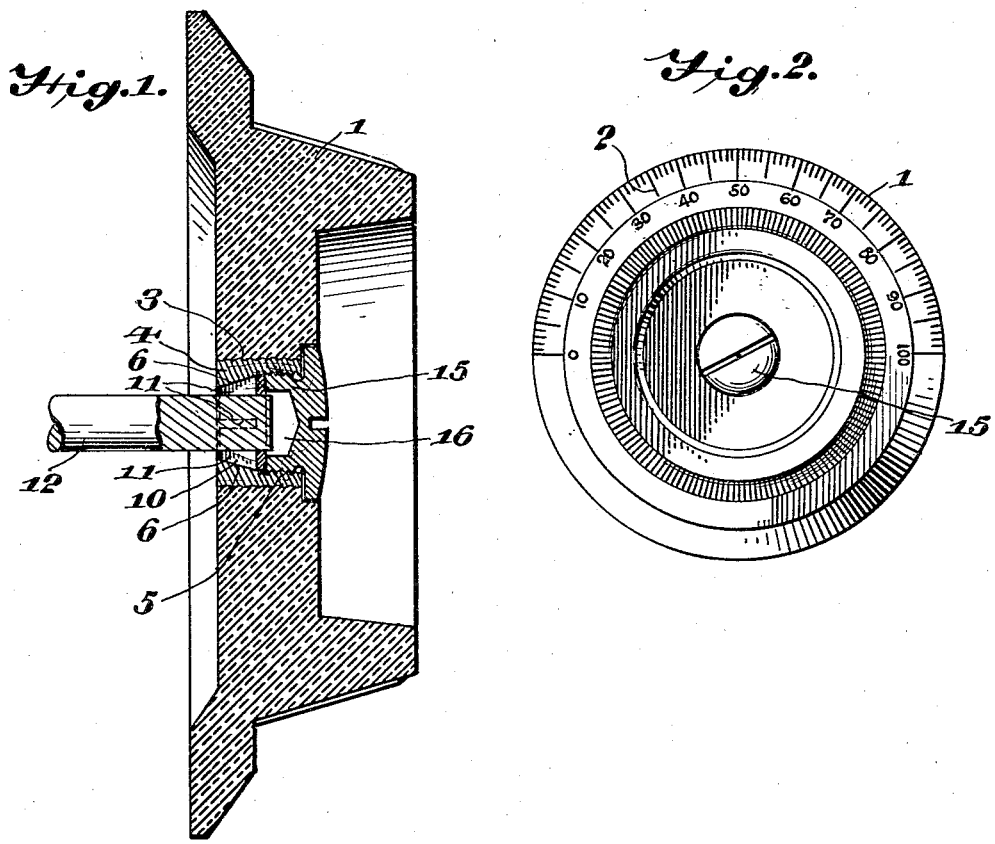
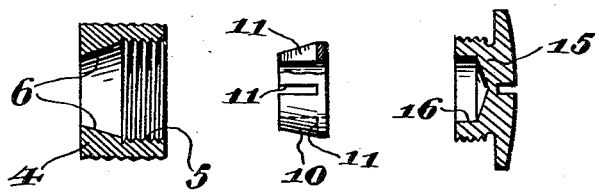
INVENTOR.
Walter L. Eckhardt
BY
Cyrus N. Anderson
ATTORNEY.

Patented Apr. 22, 1924.

1,491,342

UNITED STATES PATENT OFFICE.

WALTER L. ECKHARDT, OF PHILADELPHIA, PENNSYLVANIA, ASSIGNOR TO MUSIC MASTER CORPORATION, OF PHILADELPHIA, PENNSYLVANIA, A CORPORATION OF DELAWARE.

CLUTCH.

Application filed August 4, 1922. Serial No. 579,604.

*To all whom it may concern:*

Be it known that I, WALTER L. ECKHARDT, a citizen of the United States, and a resident of Philadelphia, in the county of Philadelphia and State of Pennsylvania, have invented an Improvement in Clutches, of which the following is a specification.

My invention relates to an improvement in clutches and it has for its general object to provide a novel construction of means by which a knob, collar, sleeve, or the like having an opening therethrough may be secured to a shaft, rod, stud, or the like which extends into or through such opening. By the said means such knob, collar, sleeve, or the like may be rigidly and relatively immovably secured to the said member.

A further object of the invention is to provide a novel construction of clutch of such character that a member which it is desired to secure to the end portion of a shaft, stud, or rod may be adjusted to any position desired relatively to said shaft, rod, stud, or the like and thereafter firmly and relatively immovably secured thereto without alteration of the position of the said shaft, rod, stud, or the like.

A still further object of my invention is to provide a clutch adapted for the purpose indicated by the employment of which one member, such as a knob, may be secured to the end portion of a shaft or the like after the latter has been adjusted to the exact position desired without disturbing the same.

Other objects and advantages of the invention will be pointed out in the detailed description thereof which follows or will be apparent from such description.

In order that the invention may be readily understood and its practical advantages fully appreciated reference may be had to the accompanying drawing in which I have illustrated one mechanical form of embodiment thereof. However, it will be understood that changes in the details of construction may be made within the scope of the claims without departing from the said invention.

In the drawing:

Fig. 1 is a longitudinal sectional view of the outer end portion of a shaft and a dial knob or disk supported thereon and of a clutch embodying my invention for securing the knob to the shaft;

Fig. 2 is a view in front elevation of the dial knob secured to the shaft in the manner indicated in Fig. 1;

Fig. 3 is a longitudinal sectional view of a bushing for the knob;

Fig. 4 is a view partly in section and partly in side elevation of the gripping member of the clutch; and Fig. 5 is a longitudinal sectional view of a screw having a hollow inner end portion for contacting with the gripping member shown in Fig. 4 to cause the same to grip the adjacent portion of the shaft, rod, or stud, as the case may be, which may be embraced thereby.

In the construction as illustrated I have shown my invention employed for securing a dial having a scale thereon to the outer end of a shaft, upon the inner portion of which (not shown) the variometer of a radio apparatus is secured. It will be understood, however, that my invention is not limited in its use for this particular purpose and may be employed for securing knobs or similar devices to the end portions or other parts of shafts, rods, studs, or the like which projects into or through openings therethrough.

Referring to the drawings: 1 designates a dial knob having the scale 2 upon the upper half thereof, as shown. This knob is adapted for use in the adjustment of a variometer, as already indicated, but a knob of any other style or device of any other generally similar character may be substituted for the knob shown. The said knob is provided with an opening 3 through the center thereof within which is situated a metal bushing 4, the outer surface of which is roughened so as to insure that it will remain permanently in position within the opening 3. The outer portion of the opening through the bushing 4 is screw-threaded, as indicated at 5, while the inner portion of said opening is tapered, as indicated at 6. A tapered gripping member 10 is adapted to enter the bushing 4 and its outer tapered surface is adapted to seat against the tapered surface 6 of the inner portion of the opening through said bushing. The gripping member 10 is hollow; that is, is provided with an opening extending therethrough and the sides thereof are slotted, as indicated at 11. These slots open upon the inner end of the gripping member 10 and terminate a short distance from the outer end thereof, as is clearly indicated in Fig. 4 of the drawing. The gripping member 10 is adapted to encircle or embrace the outer end portion of a shaft 12, as indicated in Fig. 1 of the drawing. After the parts 1, 4 and 10 have been assembled in the manner as indicated in Fig. 1 of the drawing a screw-threaded plug 15 having a hollow inner end, as indicated at 16, is screwed into the outer internal screw-threaded end portion of the bushing 4 so that its inner end contacts with the outer end of the tapered gripping member 10 and pushes the same inwardly. The pushing of the said gripping member inwardly causes a contraction of the yielding portions or parts thereof between the slots 11 whereby such portions or parts are caused to grip with greater or less force, depending upon the force employed for turning the screw 15 inwardly, the shaft 12. In the construction as shown the screw 15 is provided with a relatively wide head. It will be understood, however, that my invention is not dependent upon a screw having a head of any particular character or design or even any head at all. It is, however, essential that the inner portion of the screw shall be hollow as described or that a hole shall be provided to extend entirely through the same so that the annular inner end portion thereof may contact and co-operate with the outer correspondingly shaped end of the gripping member 10 which pushes or forces the latter inwardly to compress the yielding portions or parts thereof intermediate the slots 11 against the shaft, rod, or bolt, as the case may be.

It will be seen that I have provided a clutch or fastening device which, upon the loosening of the screw 15, will permit the adjustment of the dial knob 1 or other similar device to any position desired with respect to the shaft, rod, bolt, or the like to which the said knob or other similar device may be secured without disturbing the said shaft, rod, etc.

Having thus described my invention what I claim and desire to secure by Letters Patent is:

1. Means for connecting a member having a hole extending therethrough the inner end portion of which is tapered and the outer end portion of which is screw-threaded to a shaft, rod, stud, or the like having an end portion which projects into said hole, which means comprises a tapered member situated within the tapered portion of said opening and encircling the end portion of said shaft, rod, stud, or the like which projects into said opening, which tapered member is provided with slots at intervals therein, and a screw-threaded plug in engagement with the screw-threaded portion of said opening, the inner end of which screw-threaded plug is adapted to engage the outer end portion of the said member to force the same inwardly to cause the parts thereof intermediate the said slots to clamp the adjacent portion of the said shaft, rod, stud, or the like.

2. Means for connecting a member having a hole extending therethrough the inner end portion of which is tapered and the outer end portion of which is screw-threaded to a shaft, rod, stud, or the like having an end portion which projects into the tapered portion of said opening, which means comprises a tapered member encircling the said end portion and situated within the tapered end of the said opening, which tapered member is provided with yielding parts, and a screw-threaded plug, the inner end portion of which is hollow, which screw-threaded plug is adapted to engage the screw-threaded outer end portion of the said opening, the inner annular end portion of the said plug being adapted to engage the outer end of the said tapered member to force the same inwardly to cause the yielding parts thereof to clamp the adjacent portion of the said shaft, rod, stud, or the like which is embraced within the said tapered member.

3. In combination, a knob having a central opening extending therethrough, the inner end portion of which is tapered and the outer end portion of which is screw-threaded, a shaft, rod, stud, or the like, one end portion of which projects into the tapered portion of said opening, a tapered clamping member situated within the tapered portion of said opening and embracing the said end portion of the said shaft, rod, stud, or the like, said tapered clamping member having slots situated at intervals therein which slots open upon the inner edge of the said member, and a screw-threaded plug having a hollow inner end portion, which plug is adapted to engage the screw-threads at the outer end portion of said opening and the inner end of which is adapted to engage the outer end of the said tapered member whereby the latter may be forced inwardly to cause the parts thereof intermediate the said slots to clamp against the portion of the shaft, rod, bolt, or the like embraced thereby.

4. Means for detachably and adjustably securing a knob, sleeve, collar, or the like having an opening therethrough the inner end of which is tapered and the outer end of which is screw-threaded to a shaft, rod, stud, or the like, which comprises an annular tapered member situated within the tapered portion of said opening and embracing a portion of the said shaft, rod, stud, or the like, which annular member comprises yielding parts, and a screw-threaded plug adapted to be screwed into the screw threaded portion of the said opening and the inner end of which is adapted to engage the outer end of the said tapered member to force the latter inwardly and cause the yielding parts thereof to clamp against the adjacent portions of the shaft, rod, stud, or the like embraced thereby.

5. A clutch for securing a knob, collar, sleeve, or the like to a shaft, rod, stud, or the like which comprises a bushing secured within an opening in the said knob, collar, sleeve, or the like, the inner end portion of the opening through said bushing being tapered and the outer end portion thereof being screw-threaded, a tapered annular clamping member situated within the tapered portion of the opening through said bushing which clamping member is provided with slots at intervals therein which open upon the inner edge thereof leaving the outer edge of the said tapered member integral, the said tapered member embracing a portion of the said shaft, rod, stud, or the like within said opening, and a plug having screw-threaded engagement with the outer screw-threaded end portion of the said opening, the inner end of which plug is adapted to contact with the outer end of the said tapered member to force the latter inwardly to cause the portions thereof intermediate the said slots to clamp against the portion of the said shaft, rod, stud, or the like embraced thereby.

In testimony that I claim the foregoing as my invention I have hereunto signed my name this 2nd day of August, A. D., 1922.

WALTER L. ECKHARDT.